(12) United States Patent
Burnett et al.

(10) Patent No.: US 7,136,098 B1
(45) Date of Patent: Nov. 14, 2006

(54) IMAGE ILLUMINATION OPTIMIZING

(75) Inventors: Michael Burnett, Shawnee, OK (US); Todd Plevinsky, Lexington, MA (US); Garry Womack, Edmond, OK (US)

(73) Assignee: Smith & Nephew, Inc., Memphis, TN (US)

( * ) Notice: Subject to any disclaimer, the term of this patent is extended or adjusted under 35 U.S.C. 154(b) by 0 days.

(21) Appl. No.: 09/177,837

(22) Filed: Oct. 23, 1998

(51) Int. Cl.
H04N 5/235 (2006.01)
A61B 1/04 (2006.01)

(52) U.S. Cl. .................................... 348/230.1; 348/65
(58) Field of Classification Search ................ 348/65, 348/73, 74, 76, 229.1, 230.1
See application file for complete search history.

(56) References Cited

U.S. PATENT DOCUMENTS

| | | | |
|---|---|---|---|
| 4,628,362 A * | 12/1986 | Waehner | 348/572 |
| 4,737,814 A | 4/1988 | Nakajima | 254/412 |
| 4,845,554 A * | 7/1989 | Kimura et al. | 348/69 |
| 4,868,645 A * | 9/1989 | Kobayashi | 348/69 |
| 4,984,088 A | 1/1991 | Tani et al. | 348/296 |
| 5,068,719 A * | 11/1991 | Tsuji | 348/65 |
| 5,091,779 A | 2/1992 | Ams et al. | |
| 5,115,319 A | 5/1992 | Arai et al. | 348/230 |
| 5,162,913 A | 11/1992 | Chatenever et al. | 348/230 |
| 5,251,037 A * | 10/1993 | Busenberg | 348/252 |
| 5,272,538 A * | 12/1993 | Homma et al. | 348/362 |
| 5,349,415 A * | 9/1994 | Nishida | 348/364 |
| 5,408,263 A * | 4/1995 | Kikuchi et al. | 348/229 |
| 5,475,420 A * | 12/1995 | Buchin | 348/72 |
| 5,589,874 A | 12/1996 | Buchin | 348/72 |
| 5,608,451 A | 3/1997 | Konno et al. | 348/69 |
| 5,614,949 A * | 3/1997 | Suzuki et al. | 348/296 |
| 5,638,120 A | 6/1997 | Mochizuki et al. | 348/296 |
| 5,801,773 A * | 9/1998 | Ikeda | 348/229 |
| 5,875,022 A * | 2/1999 | Kajiwara | 382/291 |
| 5,883,666 A * | 3/1999 | Kyuma et al. | 348/229 |
| 5,959,670 A * | 9/1999 | Tamura et al. | 348/229 |
| 6,208,385 B1 * | 3/2001 | Konishi et al. | 348/558 |
| 2002/0093563 A1* | 7/2002 | Cline et al. | 348/65 |

FOREIGN PATENT DOCUMENTS

EP 0488442 5/1997

OTHER PUBLICATIONS

Abstract: Electronic Shutter Driver, Japio 94-303476.
Abstract: Electronic Shutter Driver, Japio 94-303475.
Abstract: Image Pickup Device Using Solid-State Image Pickup Element, Japio 94-268898.
Abstract: Electronic Endoscope System, Japio 93-329101.
Abstract: Electronic Shutter Circuit for Electronic Endoscope, Japio 93-293081.
Abstract: Electronic Shutter Control Device for Electronic Endoscope . . . , WPAT 96-110505/12.
Abstract: Electronic Shutter Control Device for Electronic Endoscope . . . , WPAT 96-110504/12.

(Continued)

Primary Examiner—Vivek Srivastava
Assistant Examiner—Jason Whipkey
(74) Attorney, Agent, or Firm—Fish & Richardson P.C.

(57) ABSTRACT

The brightness of an actual image produced by an image sensor (e.g., CCD) of an electronic camera, is controlled with image size detection circuitry which, in response to electrical signals received from the electronic camera, determines an actual image area occupying a total image area of the image sensor. A control signal, based on the actual image area, is generated and sent to the electronic camera for controlling the electronic shutter.

23 Claims, 5 Drawing Sheets

OTHER PUBLICATIONS

Abstract: Image Pick-Up Device for Electronic Endoscope . . . , WPAT 95-376257/49.
Abstact: Electronic Endoscope appts.—has discriminator for . . . , WPAT 95-117888/16.
Abstract: Electronic Shutter Drive Control Device for Electronic Endoscope or Camera . . . , WPAT 95-017921/03.
Abstract: Electronic Shutter Drive Control Device for Electronic Endoscope or Camera . . . , WPAT 95-017920/03.
Abstract: An Image Pick-up Equipment uses a Charge Coupled Device . . . , WPAT 94-353420/44.
Abstract: Electronic Shutter Control Method for Image Equipment . . . , WPAT 94-353344/44.
Abstract: Imaging apparatus, e.g., electronic endoscopic, camera, etc . . . , WPAT 94-345880/43.
Abstract: Electronic Shutter Control Equipment for Electronic Endoscope . . . , WPAT 94-337092/42.
Abstract: Electronic Endoscope with Electronic Shutter Function . . . , WPAT 94-021949/03.
Abstract: Electronic Shutter Circuit for Electronic Endoscope . . . , WPAT 93-391768/49.
Abstract: Videoendoscope with Adjustable Synchronisation . . . , WPAT 97-168103/16.
Wenzler, H. (1993) "Endoscopic cold-light source with intensity regulation." Dissertation, Stuttgart University Institute for Biomedical Technology, pp. 1-58 (63 pages) (German).
Wenzler, H. (1993) "Endoscopic cold-light source with intensity regualtion." Dissertation, Stuttgart University Institute for Biomedical Technology (34 pages) (Egnilsh Translation).
The World of Endoscopy, Endoscopic Surgery In General Surgery, $2^{nd}$ Issue, 1/96 (2 pages).
The World of Endoscopy, Endoscopic Surgery in General Surgery, $2^{nd}$ Issue, 1/96 (2 pages) (English Translation).
Storz Catalogue, Karl Storz, Endoskope, Version 1.0 (33 pages) (1995).

* cited by examiner

IMAGE ILLUMINATION OPTIMIZING

BACKGROUND OF THE INVENTION

The invention relates to displaying images generated by a camera, and, in particular, to images generated by an electronic camera attached to a medical viewing instrument.

In general, medical viewing instruments, such as endoscopes, are instruments for viewing the interior of an object, such as the human body. For example, during a surgical procedure, an endoscope is inserted into the body to view an internal organ or anatomical body passage, such as the intestine.

A typical endoscope includes an elongated outer tube within which a lens system is disposed at a distal end. Light reflected from the object being viewed travels through the lens system and exits at a proximal end of the tube for viewing by a user either directly or via an imaging device, such as an electronic camera having a charge coupled device (CCD). The camera generates a video signal that represents the optical image of the object being viewed with the endoscope. The video signal generated by the camera is processed and displayed on a display device, such as a Cathode Ray Tube (CRT) Monitor.

In applications where a camera is used, a coupler having a zoom lens assembly may be positioned between the endoscope and the camera. The endoscope/coupler combination, in essence provides an endoscope with zoom capability.

SUMMARY OF THE INVENTION

The invention features controlling the brightness of an actual image produced by an image sensor (e.g., CCD) of an electronic camera, in response to the actual image area of the actual image occupying a total area of the image sensor. In particular, electrical signals generated by the electronic camera and representative of the size of the actual image area are used to control an electronic shutter associated with the camera. The electronic shutter is generally of the type used to control the duration of time the image sensor is responsive to light incident on the image sensor.

In a general aspect of the invention, an apparatus includes image size detection circuitry, which responds to electrical signals received from the electronic camera. Based on the signals, the image size detection circuitry determines an actual image area within a total image area of the image sensor, and generates a control signal, based on the actual image area, for controlling the electronic shutter.

In another aspect of the invention, the above-described image size detection circuitry is part of a medical instrumentation system including a medical viewing instrument (e.g., an endoscope) and the electronic camera optically coupled to the medical viewing instrument. The medical viewing instrument is used to view an object under observation. The image size detection circuitry is used to determine the actual image area within the total image area of the image sensor, and to generate a control signal, based on the actual image area, for controlling the electronic shutter.

In still another aspect of the invention a method of controlling an electronic shutter used with an image sensor of an electronic camera includes the following steps. Electrical signals are received from the electronic camera. In response to the electrical signals, an actual image area within a total image area of the image sensor is determined. Based on the determined actual image area, a control signal is generated for controlling the electronic shutter.

Controlling the electronic shutter on the basis of the actual image area rather than the total image area has numerous advantages. In particular, the shutter responds only to light incident on an area of the image sensor which more closely approximates the area of the actual image. With this approach, the contribution of darkened border areas (i.e., inactive areas) of the image sensor surrounding the active image area is minimized. Thus, when the actual image is displayed on a monitor, the likelihood that the image will be "washed-out" or glared is significantly reduced.

Furthermore, because the actual image area is determined on the basis of the electrical signals provided by the electronic camera itself, control of the electronic shutter can be performed automatically and in real-time. The ability to control the shutter in this manner also allows the electronic camera and image sensor to be used with a greater variety of viewing instruments, particularly medical instruments (e.g., endoscopes, borescopes, colonoscopes).

Embodiments of these aspects of the invention may include one or more of the following features.

The electronic camera includes a plurality of predefined electronic shutter response areas, each electronic shutter response area defining different portions of the total image area of the image sensor. The control signal generated by the image size detection circuitry selects one of the electronic shutter response areas. In essence, the image size detection circuitry is used to select one of several predefined electronic shutter response areas of the electronic camera that most closely approximates the size of the actual image. The image size detection circuitry is used with a processor and a memory for storing data associated with the predefined electronic shutter response areas of the electronic camera.

The electrical signals include a luminance component received by the image size detection circuitry to determine the portion of the total image area of the image sensor containing the actual image. The luminance component of the electrical signals from the electronic camera provides a reliable indication of the level of light incident on any portion of the total image area of the image sensor.

The image size detection circuitry includes a comparator, an integrator, and an analog to digital converter. The comparator receives the luminance component of the video signals and generates a first output signal representative of a portion of the total image area. That is, the first output signal indicates the presence of a portion of an actual image. The integrator receives the first output signal from the comparator and generates a second output signal representative of the actual image area. The analog to digital converter receives the second output signal from the integrator and generates a digital signal representative of the actual image area for selecting data associated with one of the plurality of predefined electronic shutter response areas stored in the memory.

These and other features and advantages of the invention will be apparent from the following description of a presently preferred embodiment, and from the claims.

DETAILED DESCRIPTION

Figure 1:
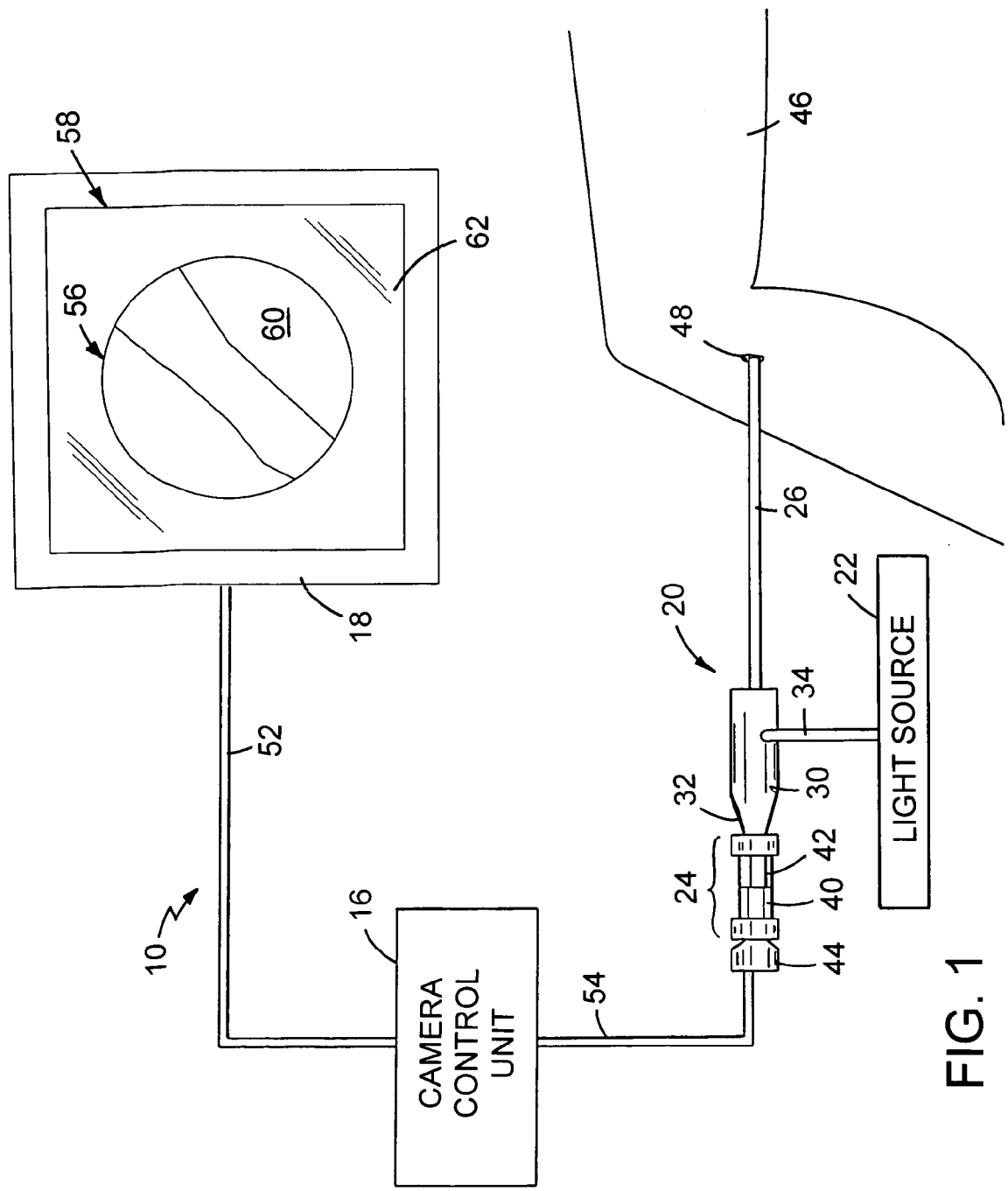
FIG. 1 is a schematic representation of a medical instrumentation system suitable for controlling the brightness of an image produced by a CCD in a camera.

Referring to FIG. 1, a medical instrumentation system 10 is shown for generating visual images from light received through a medical viewing instrument, for example, an endoscope 20, and, among other functions, controlling the brightness of the visual images. Endoscope 20 is of the type having an elongated, hollow insertion tube 26 extending from a handle portion 30 to a distal tip 28 (FIG. 2) of endoscope 20. Insertion tube 26 is shown here inserted through an incision 48 within a leg 46 of a patient to convey visual images of an observation or surgical site to an electronic camera head 44 optically coupled to handle portion 30 of endoscope 20 via a zoom lens coupler 24. A light source 22 for illuminating the observation site is connected to endoscope 20 through a light cable 34. Light from light source 22 travels through a fiber optic cable bundle (not shown) extending along the inner wall of insertion section 26. The light illuminates the object (not shown) under observation within leg 46. Light reflected from the object is received by a lens assembly within insertion section 26 of endoscope 20. To control the brightness of the received visual images, system 10 regulates the exposure of an image sensor to light from endoscope 20.

Figure 2:
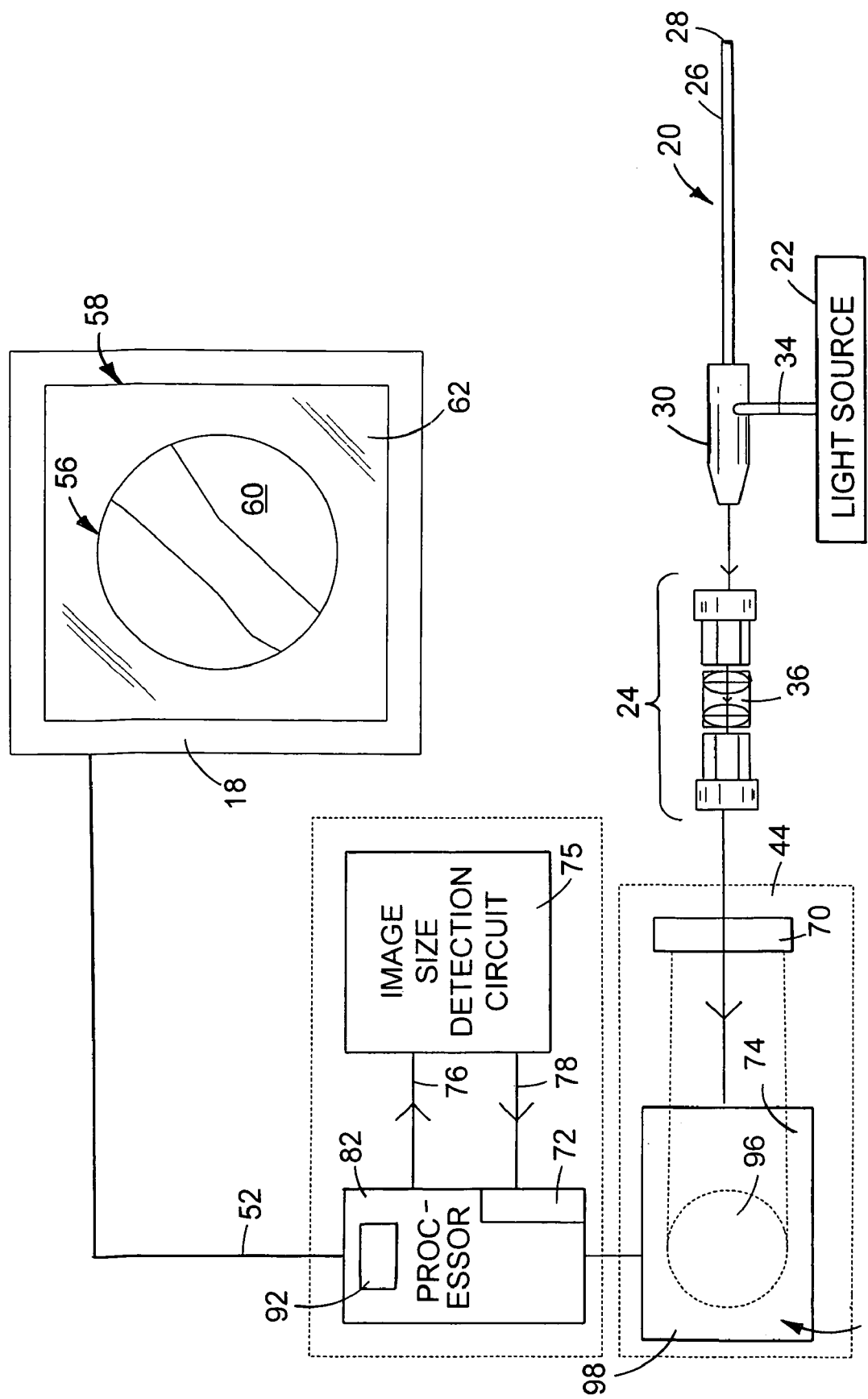
FIG. 2 is a schematic representation of the system of FIG. 1 showing the camera and camera control unit in block diagram form.
Figure 3A:
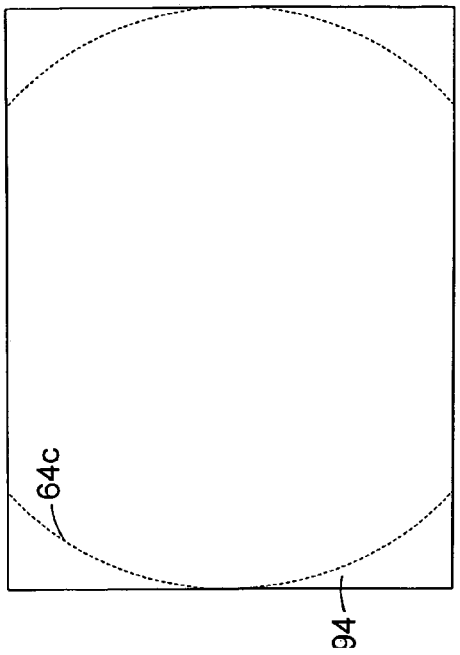
FIGS. 3a–3c illustrate medium, small and large electronic shutter response areas of the CCD, respectively.
Figure 3C:
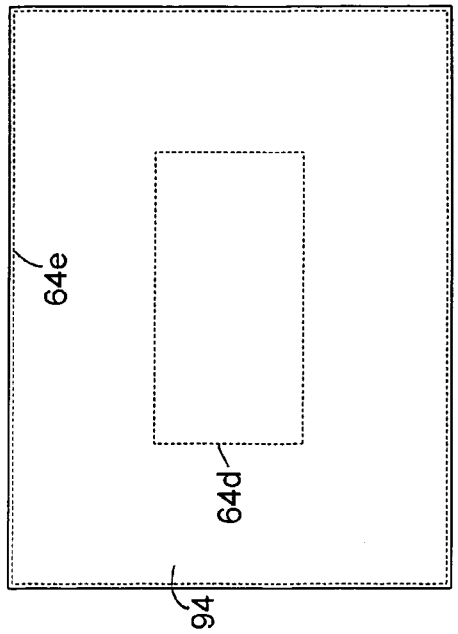
Figure 3B:
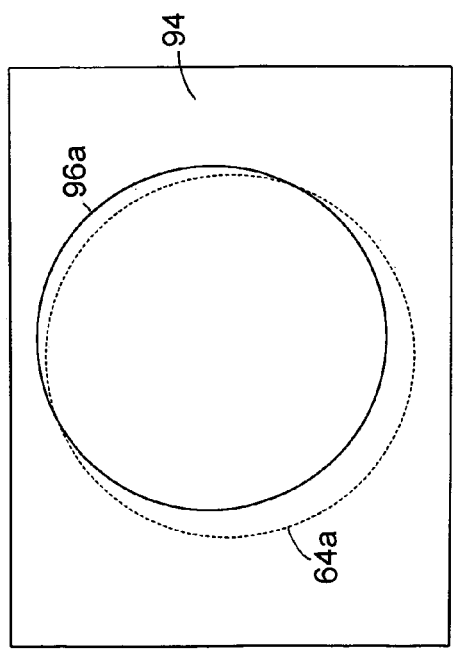
Figure 3D:
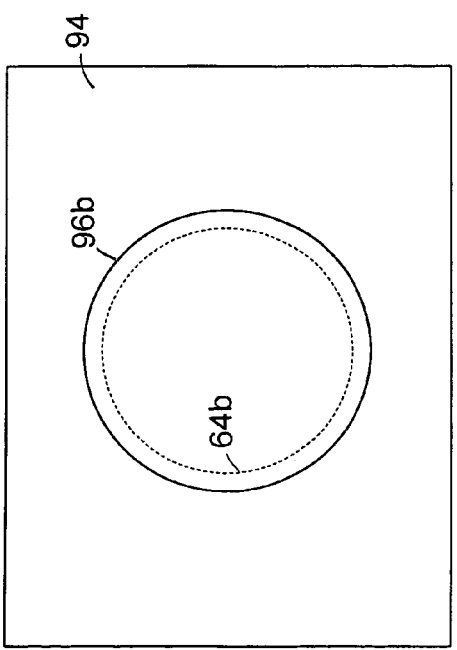
FIG. 3d illustrates a central electronic shutter response area and a shutter response pattern encompassing a total image area of the CCD.

Electronic camera head 44 receives the reflected light from endoscope 20 through zoom lens coupler 24 which is used by the physician to provide magnified images of the observation site. Zoom lens coupler 24 includes a housing 38 connected to a proximal end 32 of endoscope 20 and lens adjustment knobs 40, 42. Each knob 40, 42 rotates independently to move the lens elements of a zoom lens assembly 36 (FIG. 2). One example of a zoom lens assembly suitable for use with instrumentation system 10 is described in co-pending application Ser. No. 08/741,027 entitled "Optical Coupler", assigned to the assignee of the present invention, and incorporated herein by reference.

Camera head 44 includes an image sensor, for example, a charge coupled device or CCD 74 (FIG. 2) which generates video signals representative of the received images received by CCD 74. The signals are conveyed, via a cable 54, to a camera control unit 16 where they are processed and, as will be described in greater detail below, used to control the brightness of the image produced by CCD 74. It is important to note that signals received by camera control unit 16 are "raw" or not fully processed, i.e., the video signal is not in a format that is compatible with monitor 18.

Referring to FIG. 2, camera head 44 also includes a flat glass 70 through which reflected light passes to CCD 74 without magnifying or focusing the reflected light. CCD 74 includes an array of photoelectric cells (not shown) that transduce the reflected light into individual electrical signals that camera control unit 16 receives and uses to generate a standard video signal.

Camera control unit 16 includes a processor 82 that, among other functions, operates an electronic shutter 72, and also includes an image size detection circuit 75 that provides a control signal to processor 82 that allows electronic shutter 72 to produce a visual image having optimized brightness. It is important to note that in this embodiment electronic shutter 72 is not a mechanical device positioned between CCD 74 and the light source for controlling the amount of light incident on the CCD. Rather, electronic shutter 72 is an electronic implementation (e.g., hardware, software, or both) which controls the duration of time the photoelectric cells of CCD 74 are responsive to light incident on the CCD.

Processor 82 additionally processes the signals received from CCD 74 into separate video signal components, such as luminance and chrominance. These separate video signal components are processed and then recombined to form the fully processed video signal which is then sent to monitor 18 through cable 52 for display on monitor 18.

Electronic shutter 72 serves as a light regulator for controlling the brightness of a visual image 56 displayed on monitor 18. Visual image 56 may occupy all of an image display area 58 or, as shown, may occupy only a portion of the image display area 58. Electronic shutter 72 is the portion of processor 82 that electronically regulates the amount of light accepted by CCD 74. Specifically, electronic shutter 72 controls the light exposure of CCD 74 by controlling the light integration time of the photoelectric cells of the CCD. Thus, electronic shutter 72 controls image 56 so that the image is sufficiently bright but not so bright as to appear washed-out or glared.

In normal use, the optical system of endoscope 20 is designed to convey images of objects at distal end 28 at a fixed image plane at proximal end 32 where images are viewed (i.e., the eyepiece or mount). However, when zoom lens assembly 24 is attached to endoscope 20 to magnify the images, the size of the image received by CCD 74 varies. In particular, when magnification is at a minimum (for example, when zoom lens assembly 36 is "zoomed out"), the image received by CCD 74 may occupy a small portion of total image area 94 of the CCD. On the other hand, with maximum magnification (for example, when zoom lens assembly 36 is "zoomed in"), the image may be larger than total image area 94 of the CCD. The photoelectric cells of CCD 74 form a total image area 94 that contains two subareas: a circular active image area 96 and a bordering inactive image area 98. The area of CCD 74 on which the image is incident is the active image area. The area of CCD 74 on which the image is not incident is the inactive image area 98. For example, as shown in FIG. 2, active image area 96 of CCD 74 occupies only a portion of total image area 94 of the CCD and inactive image area 98 occupies the remainder of total image area 94 of CCD 74.

Based on the images incident on total image area 94, CCD 74 produces electronic signals that are transformed by processor 82 into a video image on monitor 18. When the signals are transformed, total image area 94 of CCD 74, which is typically small compared to the size of monitor 18, proportionately corresponds to image area 58 of monitor 18. The active image area 96 of CCD 74 corresponds to a displayed image area 60 of monitor 18, and both areas 60, 96 represent the actual image area that is produced by endoscope 20. Similarly, the inactive image area 98 corresponds to a darkened border area 62 of monitor 18, and both inactive image areas 62, 98 represent image areas that lie outside the actual image area that is produced by endoscope 20.

In typical monitors, the total image area 94 of CCD 74 roughly corresponds to total image area 58 of the monitor, but the relation is not exact. The portion of total image area 94 of CCD 74 that is actually displayed within total image area 58 of the monitor is different for different types of monitors. For example, the total image area of a typical monitor includes slightly more than total image area 94 of CCD 74. Many currently available monitors contain an "underscan" feature that, when selected, incorporates a larger area than total image area 94 of CCD 74 into the total image area of the monitor. However, for purposes of example, total image area 58 of monitor 18 displays exactly all of total image area 94 of CCD 74.

The entire image of total image area 94 of CCD 74, i.e., both the actual image area of active image 96 and the dark area of inactive image area 98, is incorporated into the fully processed video signal. The electrical signals generated by the photoelectric cells outside the active image area 96 have a relatively low signal level. On the other hand, the electrical signals generated by the photoelectric cells within active image area 96 where light is incident on the cell have a relatively larger signal level. Processor 82 incorporates the various signal levels into the fully processed video signal.

However, operating alone, processor 82 may not properly control the brightness of visual image 56 without additional controls, such as automated control signals from image size detection circuit 75 or manual input from an operator. If image size detection circuit 75, which provides an automated control signal, is absent from system 10, the displayed image area 60 may be washed-out or glared. This is because electronic shutter 72 is generally responsive to the electrical signals provided by the "entire" CCD (i.e., all photoelectric cells on total image area 94). Inactive area 98 can cause electronic shutter 72 to, in a sense, inadequately respond such that the light exposure of CCD 74 is too large. As a result, images displayed in active image area 60 of monitor 18 may be washed-out or glared. Indeed, as inactive area 94 becomes relatively larger, for example, when zoom lens assembly 36 is zoomed out, the image of active image area 60 is more likely to be washed-out or glared.

As discussed above, when the physician manipulates zoom lens coupler 24, the active image area 96 becomes larger or smaller. The proportion of active image area 96 changes relative to inactive area 98 because the size of the active image area changes relative to the total image area 94. Therefore, electronic shutter 72 may respond differently to the increase, or decrease, in the size of inactive image area 98, even though the brightness of active image area 96 may not have changed. Thus, although electronic shutter 72 could inadequately respond to an image produced by any medical viewing instrument, zoom coupler 24 can accentuate the problem of excessive brightness.

Some existing cameras may partially compensate for inadequate electronic shutter response by allowing an operator to select a electronic shutter response area that, in essence, electronically masks most or all of the inactive image area from the electronic shutter. However, such cameras do not dynamically adjust to changes in the size of the actual image. In addition, if the selected shutter response pattern is too small and directs the electronic shutter to respond to only a small portion of the actual image, changes in that small portion can affect the brightness of the overall actual image even if the brightness of the remainder of the actual image is sufficient. For example, if the small portion becomes brighter while the remainder of the actual image remains at approximately the same level of brightness, the overall image may appear too dark as the electronic shutter attempts to reduce the brightness of the small portion of the actual image. On the other hand, if the small portion becomes darker while the remainder of the actual image remains at approximately the same level of brightness, the overall image may appear too bright as the electronic shutter attempts to increase the brightness of the small portion of the actual image.

To eliminate the effect of darkened image area 98 on electronic shutter 72 and allow the electronic shutter to adequately respond to the overall image, image size detection circuit 75 recognizes that only a portion of image area 94 may be occupied by active image area 96. In particular, image size detection circuit 75 determines the approximate size of active image area 96 so that electronic shutter 72 can respond predominately to the level of brightness of active image area 96 while ignoring inactive image area 98.

Image size detection circuit 75 uses the luminance video signal component provided by processor 82 to generate electronic control signals that allow electronic shutter 72 to better control the brightness of visual image 56. The luminance video signal component is received from processor 82 by image size detection circuit 75 along analog signal line 76. Image size detection circuit 75 and processor 82 are connected in a feedback arrangement, in which the luminance video signal component is transmitted from processor 82 to image size detection circuit 75. In response to the horizontal image duration of the luminance video signal component, image size detection circuit 75 generates electronic control signals (e.g., digital words) to control electronic shutter 72.

Referring to FIGS. 3*a*–3*d*, in response to the video signal from CCD 74, the image size detection circuit 75 selects one of five predetermined electronic shutter response areas 64*a*–64*e* stored in processor 82: a medium electronic shutter response area 64*a*, a small electronic shutter response area 64*b*, a large electronic shutter response area 64*c*, a central electronic shutter response area 64*d*, and an all-electronic shutter response area 64*e* (i.e., all of the total image area 94). Each of electronic shutter response areas 64*a*–64*e* corresponds to a range of actual image areas. Image size detection circuit 75 selects one of electronic shutter response areas 64*a*–64*e* as an approximation of a given active image area 96 of CCD 74. The selected electronic shutter response area 64*a*–64*e* defines the portion of total image area 94 to which electronic shutter 72 will respond when regulating the level of brightness of active image area 96.

For example, if image size detection circuit 75 determines that active image area 96*a* (shown in FIG. 3*a*) is the actual image area, image size detection circuit 75 selects a predetermined medium electronic shutter response area 64*a*. Medium electronic shutter response area 64*a* is the area of total image area 94 to which electronic shutter 72 will respond when adjusting the light exposure of active image area 96*a*. Similarly, if image size detection circuit 75 determines that active image area 96*b* (shown in FIG. 3*b*) is the actual image area, image size detection circuit 75 selects a predetermined small electronic shutter response area 64*b*. Small electronic shutter response area 64*b* is the area of total image area 94 to which electronic shutter 72 will respond when adjusting the light exposure of image area 96*b*. Image size detection circuit 75 follows a similar process to select large, central, and all electronic shutter response areas 64*c*–64*d*.

In the present embodiment, the actual image generally received by endoscope 20 and zoom coupler 24 is a circular image incident on CCD 74. Therefore, image size detection circuit 75 is designed with the assumption that the shape of active image area 96 has a circular shape and that the position of the origin of active image area 96 is at the center of total image area 94. Based on this assumption, image size detection circuit 75 needs to determine only the area of active image area 96. To do so, image size detection circuit 75 examines the luminance video signal component to determine a combined average of the horizontal image durations over a predetermined period of time. The luminance video signal component has a higher horizontal image duration for larger active image areas than for smaller active image areas. In other words, the duration of the luminance video signal component for one full display screen will be larger for larger active images, and the duration of the luminance video signal component for one full display screen will be smaller for smaller active images. The horizontal image duration in the luminance video signal component for each full screen of the video image is proportional to the size of the active image area 94. Image size detection circuit 75 utilizes this proportional relationship to determine the size of active image area 96.

Figure 4:
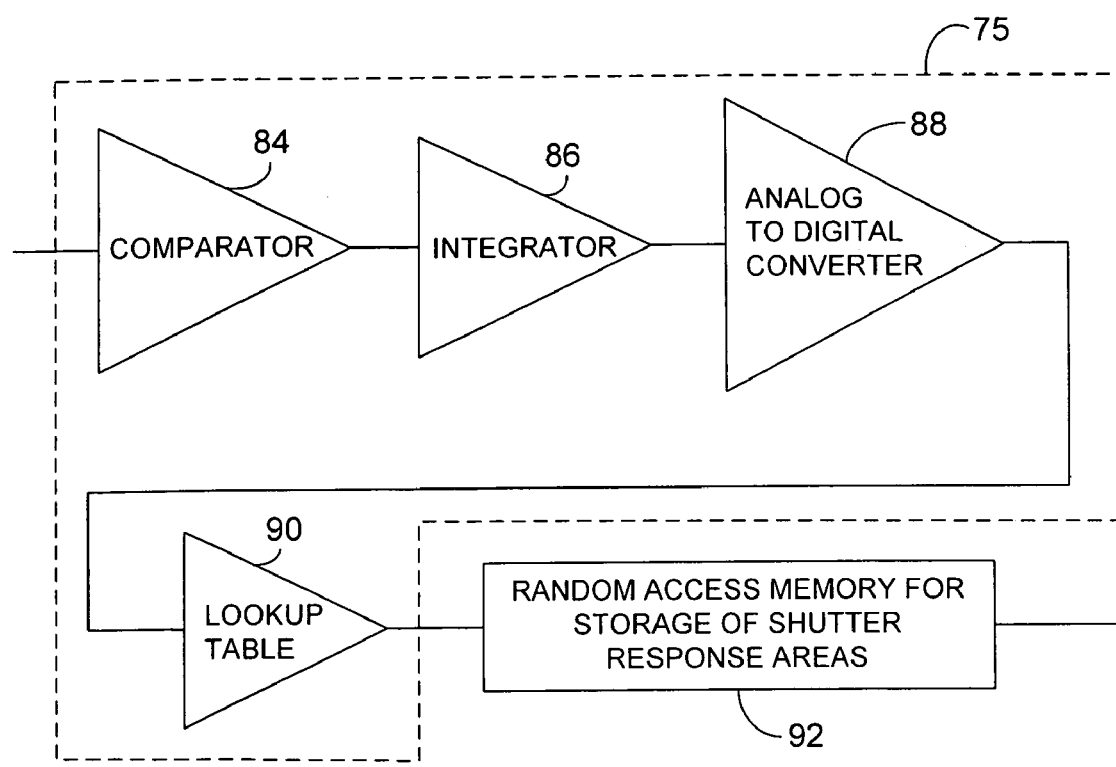
FIG. 4 is a block diagram representation of an image size detection circuit used in the system of FIG. 2.

Referring to FIG. 4, image size detection circuit 75 includes a comparator 84, an integrator 86, an analog to digital converter (A/D converter) 88, and a lookup table 90. Image size detection circuit 75 also utilizes a random access memory (RAM) 92 that is physically located in processor 92. Comparator 84 receives the luminance video signal component from processor 82 and generates a series of pulses when the signal level of the luminance signal component is greater than a predetermined threshold. The pulses represent the length of active image present on each horizontal line of the total image area 94. For example, when comparator 84 processes an electronic signal representing a horizontal line that extends through only inactive image area 98, e.g., the top line of total image area 94, the comparator outputs a logical "0" for the entire duration of time that the horizontal line is processed. However, when comparator 84 processes an electronic signal representing another horizontal line that extends through both inactive image area 98 and active image area 96, e.g., the center line of total image area 94, the comparator transitions from a logical "0" to a logical "1" at the leading edge of active image area 96 and transitions back to a logical "0" at the trailing edge of active image area 98.

Integrator 86 receives the series of pulses from comparator 86 and integrates the pulses to produce a DC voltage level output. The DC voltage level is proportional to the total duration of the positive pulses from comparator 84. In essence, the output of integrator 86 represents the area of the actual image present in one video screen, i.e., a snapshot of the actual image area within total image area 94.

A/D converter 88 receives the DC voltage output from integrator 86 and converts the DC voltage output into a digital word received by lookup table 90. Lookup table 90 converts a range of digital input words into a corresponding one of five digital output words, for example, 00 hex to 04 hex. Thus, one continuous range of voltage levels from integrator 86 corresponds to one of the digital output words, e.g., "00" hex, and the next continuous range of video output signal levels corresponds to the next consecutive digital output word, e.g., '1011' hex, etc.

The image size detection circuit 75 transfers the selected digital output words to a photometric area address in RAM 92 that processor 82 periodically and regularly examines so that the processor can retrieve the selected electronic shutter response pattern 64a–64e. It is important to note that the determination of image size is continuous rather than periodic or synchronized to distinct video frames. Thus, image size detection circuit 75 may send data to the photometric area address of processor 82 based on both electronic signals representing a latter portion of one video screen and electronic signals representing a beginning portion of a following video screen.

Each electronic shutter response area 64a–64e is an approximation of active image area 96 that electronically masks all or most of inactive image area 98 from electronic shutter 72. Therefore, electronic shutter 72 optimizes the brightness of active image area 96 by responding predominately to active image area 96.

Image size detection circuit 75 operates in real-time to dynamically and automatically select an appropriate electronic shutter response area 64a–64e on the basis of the analog video signal received from camera head 44. In particular, image size detection circuit 75 determines the portion of total image area 94 of CCD 74 receiving the actual image provided by endoscope 20 (i.e., the active image area 96). Based on the determination, image size detection circuit 75 selects one electronic shutter response area 64a–64e that approximates the size of the actual image. As the size of active image area 96 changes, image size detection circuit 75, which is continuously determining the size of active image area 96, detects the new size of the image and automatically selects the appropriate shutter response 64a–64e according to the predefined algorithm.

Figure 5:
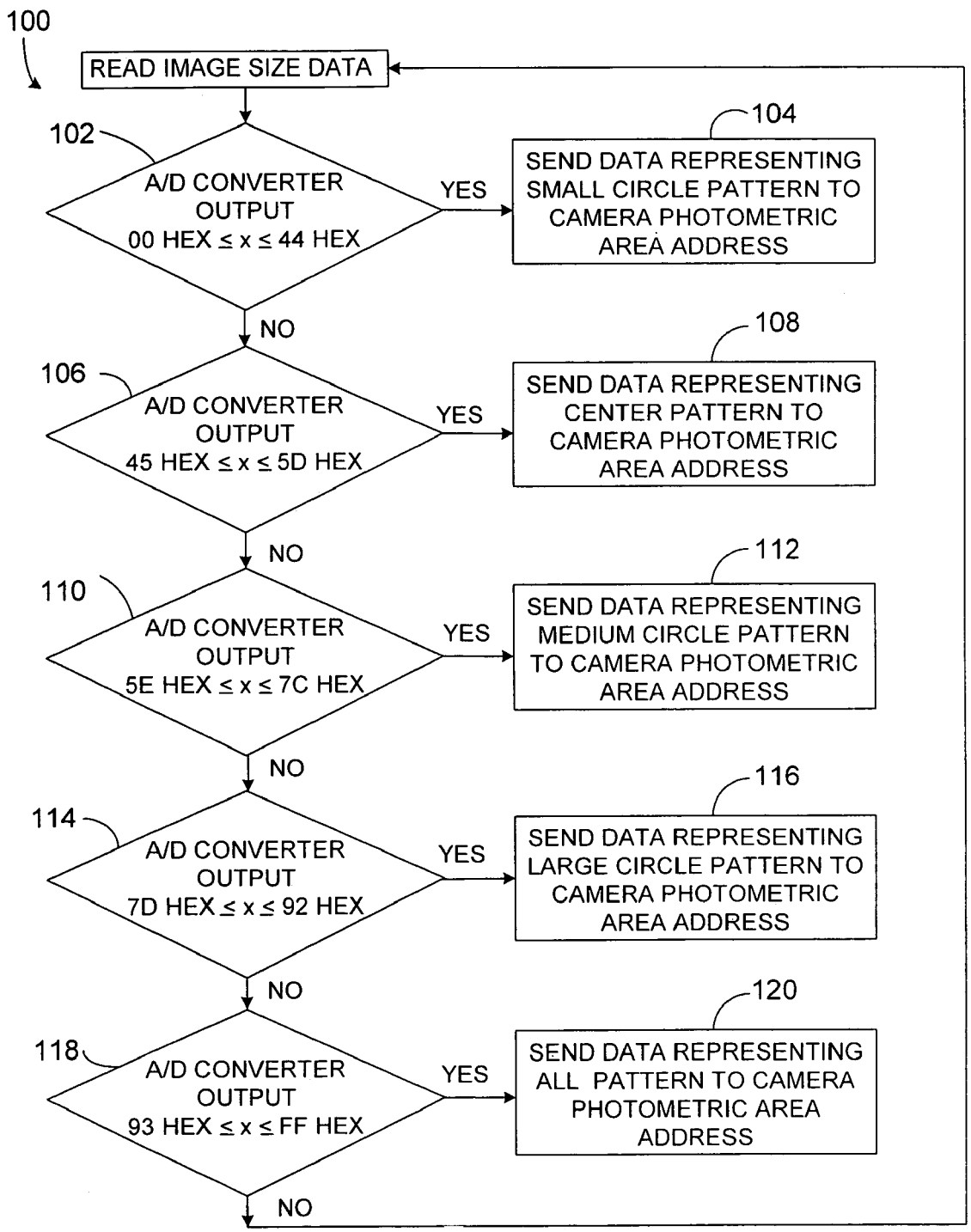
FIG. 5 is a flow diagram for the operation of the image size detection circuit of FIG. 4.

Referring also to FIG. 5, image size detection circuit 75 continuously operates according to an algorithm 100 that selects one of the five shutter response areas stored in RAM area 92 in processor 82. If the actual image area is relatively small, image size detection circuit 75 selects a relatively small shutter response area from the five prestored electronic shutter response patterns 64a–64e in RAM 92. If the actual image area is large, image size detection circuit selects a relatively large shutter response area from the five prestored electronic shutter response patterns 64a–64e in RAM 92. Image size detection circuit 75 proceeds sequentially through the steps 102, 106, 110, 114, and 118 of algorithm 100 to select, according to corresponding steps 104, 108, 112, 116, and 120, the most appropriate electronic shutter response area 64a–64e for a particular actual image. Each successive step 102, 106, 110, 114, and 118, corresponds to progressively larger actual image areas.

For example, if the size of a particular actual image area corresponds to a predefined range of digitized input words produced by A/D converter 88, e.g., "5E" hex–"7 C" hex as in step 106, image size detection circuit 75 sends data, e.g., "02" hex, representing the appropriate electronic shutter response area, e.g., medium electronic shutter response area 64a, to the photometric area address of RAM 92. If the size of the particular actual image area does not correspond to the range of digitized input words, the image size detection circuit 75 proceeds to the next sequential step of algorithm 100.

Image size detection circuit 75 produces a reasonably accurate measurement of the size of active image area 96, but the measurement is not exact. However, image size detection circuit 75 quickly and accurately determines the size of active image area 96 by integrating an average of the total amount of time, within a predetermined timeframe, that the signal for each total image area 94 represents as an actual image. Thus, image size detection circuit 75 allows system 10 to minimize system delays and to incorporate, and be compatible with, existing off-the-shelf components. Alternatively, image size detection circuit 75 can further improve (or degrade) the performance of electronic shutter 72 by selecting more (or less) accurate approximations of active image area 96 or by having lesser (or greater) amounts of delay in system 10.

However, other embodiments are within the scope of the invention.

For example, the embodiment described above approximates the size of active image area 96 and presumes that the image is located in the center of total image area 94.

However, other embodiments could measure exactly the size and shape or position of active image area 96. In addition, such embodiments could combine the position and size measurements and select an appropriate electronic shutter response area 64a–64e having a position offset to more optimally control the brightness of active image area 96. Such embodiments may require additional logic that could increase delay in the system or that could require additional components to maintain system performance, such as a microprocessor having sufficient speed and memory.

In other embodiments, the image size detection circuit could calculate the size and position of active image area 96 and use active image area 96 to formulate an exact electronic shutter response area rather than selecting a predetermined electronic shutter response area 64a–64e. The image size detection circuit and the processor could be an integrated unit or a device could be constructed of a number of different components. The RAM area could be physically located within the image size detection circuit. The image size detection circuit could be implemented using a microprocessor, integrated circuits, analog components, software, firmware, or a combination of these or other implementations. The image size detection circuit could process the fully processed video input signal. The image size detection circuit could incorporate additional electronic shutter response areas or an entirely different set of electronic shutter response areas stored in the RAM area.

A camera which allows an operator to create and store predetermined electronic shutter response areas in the RAM area of the camera could be used. In addition, shutter response patterns could be created in real time to allow specific applications, for example, a single display having multiple actual images and a different electronic shutter response area associated with each image.

The system can include optical couplers, endoscopes, and cameras that do not have a zoom lens assembly or any other zoom capability. The system can include many different medical viewing instruments, e.g, colonoscopes or borescopes, and many different coupler combinations including no coupling, no zoom coupling, or a medical viewing instrument having an integrated coupler. The system can include different types of shutters such as shutters having adjustable apertures or rotating drum shutters. The system can include different types of image sensors, for example, CMOS image sensors.

It will be appreciated by one skilled in the art that many additional and different components and many additional and different configurations other than those described herein could be used without departing from the scope of the following claims.

What is claimed is:

1. An apparatus used with an electronic camera of the type associated with an electronic shutter which controls an image sensor, the apparatus comprising image size detection circuitry, which is responsive to electrical signals received from the electronic camera and to changes in an actual image area within a total image area, for
   continuously identifying the actual image area within the total image area of the image sensor, and generating a control signal based on an average duration that a luminance signal component is greater than a predetermined threshold, the average duration being proportional to the actual image area; and
   controlling the electronic shutter using the control signal.

2. The apparatus of claim 1 wherein the electronic camera has a plurality of predefined shutter response areas, each shutter response area defining different portions of the total image area of the image sensor, said control signal selecting one of the shutter response areas, and said electronic shutter controlling said image sensor in response to the selected one of the shutter response areas.

3. The apparatus of claim 2 further comprising a processor and a memory for storing data associated with the plurality of predefined shutter response areas of the electronic camera.

4. The apparatus of claim 3 wherein the electrical signals includes a luminance component used by the image size detection circuitry to identify the portion of the total image area of the image sensor containing the actual image.

5. The apparatus of claim 4 wherein the image detection circuitry includes:
   a comparator configured to receive the luminance component of the electrical signals and generate a first output signal representative of a portion of the total image area;
   an integrator, connected to the comparator, for receiving the first output signal from the comparator and generating a second output signal representative of the actual image area; and
   an analog to digital converter which receives the second output signal from the integrator and generates a digital signal, representative of the actual image area for selecting data associated with one of the plurality of predefined shutter response areas stored in said memory.

6. The apparatus of claim 1 wherein the image sensor includes a charge-coupled device having an array of photoelectric cells.

7. A medical instrumentation system comprising:
   a medical viewing instrument for viewing an object under observation;
   an electronic camera optically coupled to the medical viewing instrument, for generating electrical signals representative of an actual image viewed by the electronic camera said electronic camera associated with an electronic shutter which controls an image sensor;
   image size detection circuitry, responsive to electrical signals received from the electronic camera and to changes in an actual image area within a total image area, for
   continuously identifying the actual image area within the total image area of the image sensor, and generating a control signal based on an average duration that a luminance signal component is greater than a predetermined threshold, the average duration being proportional to the actual image area; and
   controlling the electronic shutter using the control signal.

8. The medical instrumentation system of claim 7 wherein the electronic camera has a plurality of predefined shutter response areas, each shutter response area defining different portions of the total image area of the image sensor, said control signal selecting one of the shutter response area, and said electronic shutter controlling said image sensor in response to the selected one of the shutter response areas.

9. The medical instrumentation system of claim 8 further comprising a processor and a memory for storing data associated with the plurality of predefined shutter response areas of the electronic camera.

10. The medical instrumentation system of claim 9 wherein the electrical signals includes a luminance component used by the image size detection circuitry to identify the portion of the total image area of the image sensor containing the actual image.

11. The medical instrumentation system of claim 10 wherein the image detection circuitry includes:
- a comparator configured to receive the luminance component of the electrical signals and generate a first output signal representative of a portion of the total image area;
- an integrator, connected to the comparator, for receiving the first output signal from the comparator and generating a second output signal representative of the actual image area; and
- an analog to digital converter which receives the second output signal from the integrator and generates a digital signal, representative of the actual image area for selecting data associated with one of the plurality of predefined shutter response areas stored in said memory.

12. The medical instrumentation system of claim 7 wherein the image sensor includes a charge-coupled device having an array of photoelectric cells.

13. A method of controlling an electronic shutter used with an image sensor of an electronic camera, the method comprising:
- receiving electrical signals from the electronic camera,
- continuously identifying, in response to the electrical signals and changes in an actual image area within a total image area, the actual image area within the total image area of the image sensor; and
- generating a control signal based on an average duration that a luminance signal component is greater than a predetermined threshold, the average duration being proportional to the actual image area; and
- controlling the electronic shutter using the control signal.

14. The method of claim 13 wherein the electronic camera has a plurality of predefined shutter response areas, each shutter response area defining different portions of the total image area of the image sensor, and controlling the electronic shutter further includes selecting one of the shutter response areas.

15. The method of claim 14 wherein the electrical signals includes a luminance component for determining the portion of the total image area of the image sensor containing the actual image.

16. The method of claim 15 wherein identifying an actual image area occupying a total image area of the image sensor includes:
- comparing the luminance component of the electrical signals with a predetermined threshold value and generating a first analog output signal representative of a portion of the actual image area occupying the total image area;
- integrating the first output signal and generating a second analog output signal representative of the actual image area; and
- converting the second analog signal to a digital signal representative of the actual image area for selecting data associated with one of the plurality of predefined shutter response areas.

17. The method of claim 13 wherein the image sensor includes a charge-coupled device having an array of photoelectric cells.

18. An apparatus used with an electronic camera of the type associated with an electronic shutter which controls an image sensor, the apparatus comprising image size detection circuitry, which is responsive to image signals received from the electronic camera and to changes in an actual image area within a total image area, for
- continuously measuring the active image area within the total image area of the image captured by the image sensor, generating a control signal based on an average duration that a luminance signal component is greater than a predetermined threshold, the average duration being proportional to the actual image area; and
- controlling the electronic shutter using the control signal.

19. The apparatus of claim 18 wherein the electronic camera has a plurality of predefined shutter response areas, each shutter response area defining different portions of the total image area of the image sensor, said control signal selecting one of the shutter response areas, and said electronic shutter controlling said image sensor in response to the selected one of the shutter response areas.

20. The apparatus of claim 19 further comprising a processor and a memory for storing data associated with the plurality of predefined shutter response areas of the electronic camera.

21. The apparatus of claim 20 wherein the electrical signals includes a luminance component used by the image size detection circuitry to determine identify the portion of the total image area of the image sensor containing the active image.

22. The apparatus of claim 21 wherein the image detection circuitry includes:
- a comparator configured to receive the luminance component of the electrical signals and generate a first output signal representative of a portion of the total image area;
- an integrator, connected to the comparator, for receiving the first output signal from the comparator and generating a second output signal representative of the actual image area; and
- an analog to digital converter which receives the second output signal from the integrator and generates a digital signal, representative of the actual image area for selecting data associated with one of the plurality of predefined shutter response areas stored in said memory.

23. The apparatus of claim 18 wherein the image sensor includes a charge-coupled device having an array of photoelectric cells.

* * * * *